July 2, 1957 E. ANTHONY 2,797,611

SYNCHRONIZATION SYSTEM

Filed Dec. 20, 1954 2 Sheets-Sheet 1

Eugene Anthony
INVENTOR

Eugene Anthony
INVENTOR 2,797,611
Patented July 2, 1957

2,797,611

SYNCHRONIZATION SYSTEM

Eugene Anthony, Farmingdale, N. Y.

Application December 20, 1954, Serial No. 476,111

11 Claims. (Cl. 88—16.2)

This invention relates to a synchronization system and more particularly to a system for synchronizing a motion picture projector of the silent-film type with a magnetic tape recorder reproducer.

The invention permits a sound tape to be recorded as a sound accompaniment to a film which has been previously processed in conventional manner.

Many types of synchronization systems are known in which the motion picture film, the projector or the tape recorder is designed especially to perform the synchronization function. Therefore the conventional projector and tape recorder are not suitable for such systems.

In accordance with my invention any type of silent-film projector and any type of tape recorder may be employed. The only restriction on the tape recorder is that it utilizes a dual-track tape. The motion picture film required is the ordinary silent-film, may be of any suitable dimension and requires no special processing.

It is an object of my invention to provide a system for obtaining the frame-by-frame speed synchronism between tape and film, without the necessity of obtaining compatible film and tape speeds.

It is a feature of my invention to record at a predetermined frame speed the location of each picture frame on the tape so that synchronism prevails despite tape stretch, slip, or speed errors in the tape recorder unit.

It is a further object of my invention to provide a novel speed-regulator circuit which controls the speed of the projector to agree with the picture frame information recorded on the tape.

It is another object of my invention to provide a novel form of voltage comparing circuit which gives an early indication of the tendency to shift in synchronization, and an indication of loss of synchronization if that should occur.

It is a further object of this invention to provide a circuit which permits the projector motor to rapidly attain its normal operating speed before automatic synchonization takes control.

In accordance with one aspect of my invention, there is provided, in combination, a silent-film motion picture projector, a magnetic tape recorder reproducer utilizing a dual-track tape, with intelligence being recorded on one of the tracks, and a system for synchronizing the intelligence recorded on the tape with predetermined frames of the motion picture film. The synchronization system comprises means for generating a control signal having a frequency related to a predetermined film speed and to the number of sprocket holes per frame of film. The control signal is recorded on the other track of the tape and has a selected physical relationship with the track on which the intelligence is recorded. A second signal is developed from the film projector having a frequency corresponding to the actual film speed. The signals are compared in a comparision circuit to produce a voltage indicative of the deviation from "dead-center" synchronization between the projector and tape recorder. This voltage is then applied to a variable speed control circuit which controls the speed of the projector motor to correct any tendency to shift in synchronization.

The above-mentioned and other features and objects of this invention and the manner of attaining them will become more apparent and the invention itself will be best understood by reference to the following description of an embodiment of the invention taken in conjunction with the accompanying drawings, in which.

Before describing the essential components comprising this invention, it would facilitate an understanding of the invention to describe first the conventional apparatus used in conjunction therewith.

The required apparatus comprises a dual track magnetic tape unit which is capable of making and playing back sound recordings. There are no practical restrictions on the quality, or characteristics of the unit to make it applicable to this invention. This unit will, hereinafter, be referred to as a "tape recorder." In addition to the tape recorder, there is also required a "silent" motion picture projector employing any film size, such as 8, 16 or 35 millimeter. It is essential only that the projector be capable of being started and stopped simply by applying or removing the electrical energy, and that the motor be of variable speed design, so that motor speed is capable of being varied by changing of its electrical power input.

The standard dual-track tape recorder utilizes a recording/reading "head" which is oriented to employ one track which occupies one-half of the width of the tape. The purpose of the dual-track system when used in applications other than this invention, is to double the running time of a given length of tape.

In accordance with my invention, both tracks of the tape are used simultaneously. One track is used in the conventional manner and it serves as the sound track on which intelligence is recorded. The other track is used as the projector control track and is used simultaneously with the first track by the addition to the recorder of an auxiliary recording/reading head. While the auxiliary head, per se, is conventional, it forms part of the novel combination. The auxiliary head is added to the tape recorded by any suitable fastening means, overlying the other track of the tape which cooperates with the main head and is designed to be held in such a position that the tape passes by the auxiliary head preferably, but not necessarily, before it passes by the main head.

Figure 1:
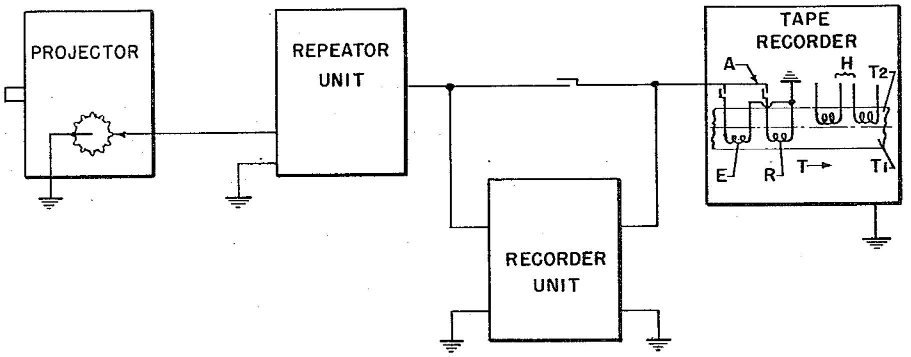
Fig. 1 is a block diagram of the combination forming one aspect of my invention.

Referring now to Fig. 1, there is shown by block diagram the combination forming one aspect of my invention. The combination comprises a projector, to which there is connected a switch S which is mounted in such a way as to be actuated by one of the film sprockets. The switch may be a sensitive spring-loaded lever-operated switch or a simple contact point mounted in such position that each sprocket tooth touches it as the sprocket rotates. One side of the switch is grounded, e. g., to the frame of the projector. As will be explained more fully hereinafter, the sprocket switch develops pulses which are applied to a repeater unit.

Figure 2:
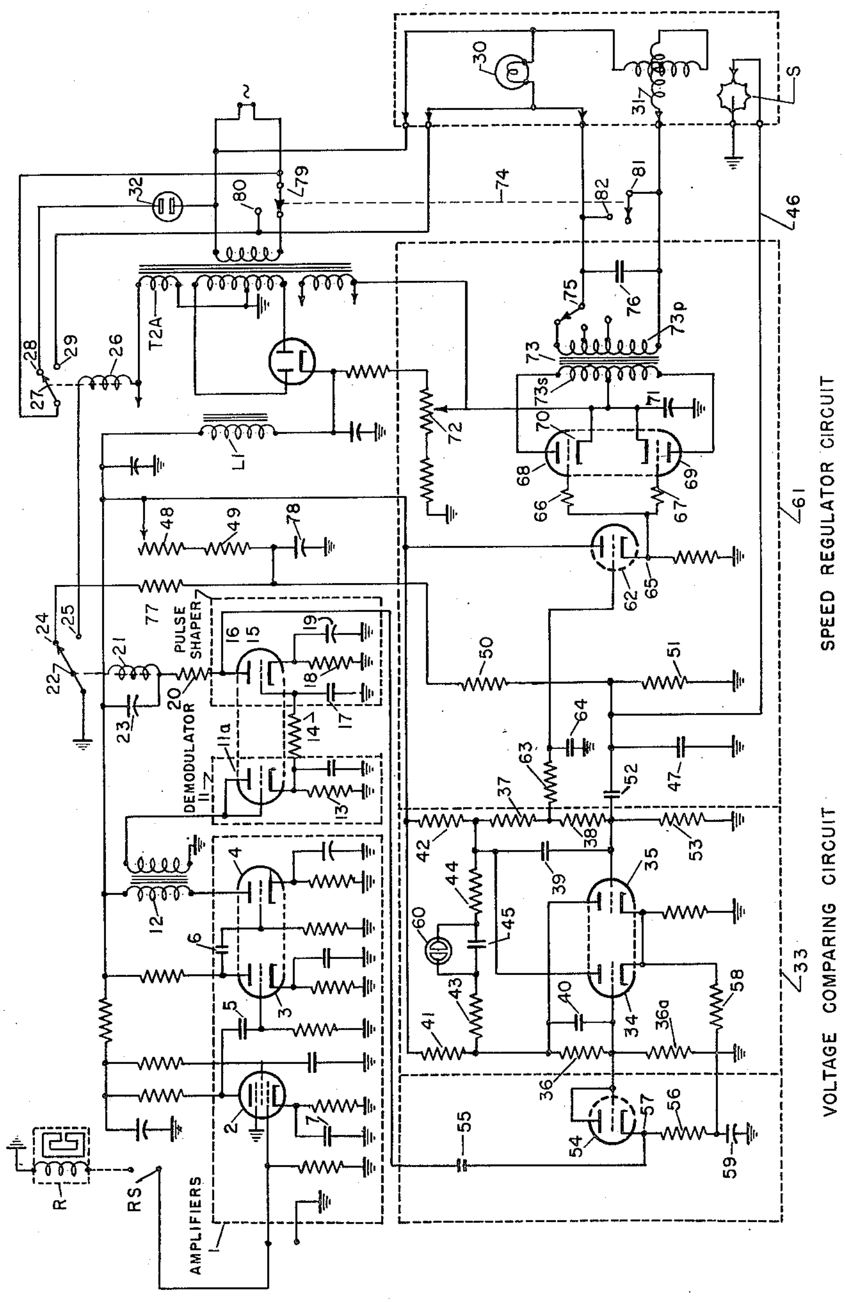
Fig. 2 is a schematic diagram of a repeater unit, one of the basic circuits shown in block form in Fig 1.

The repeater unit which is shown in detail in Fig. 2, comprises the necessary circuitry to regulate the speed of the projector in synchronism with the tape recorder. The speed is regulated by comparing the time position of the pulses which are generated by operation of the sprocket switch and control pulses picked up from the tape by the auxiliary head.

Figure 3:
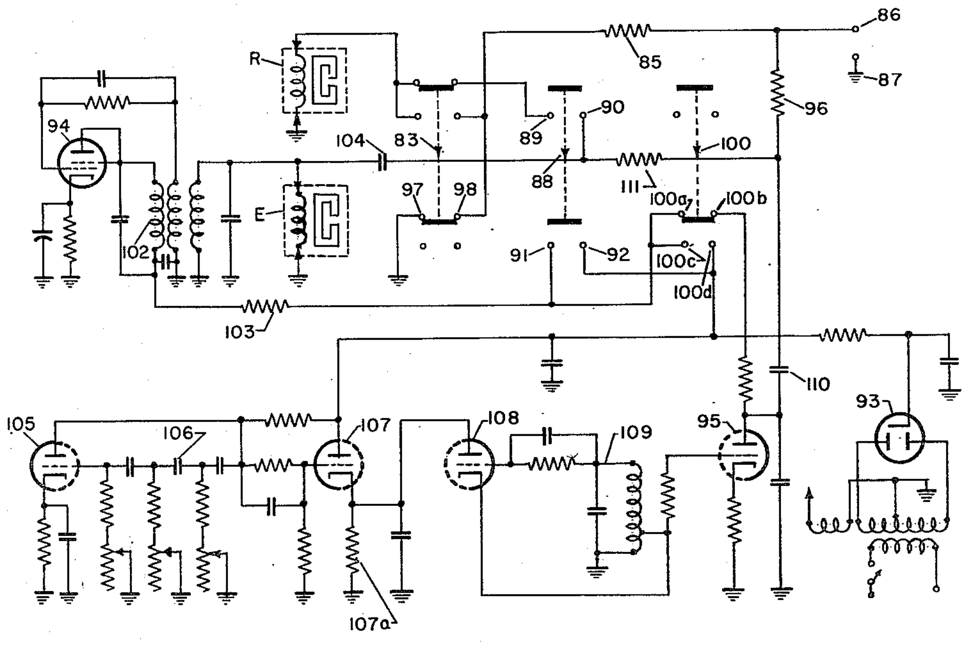
Fig. 3 is a schematic diagram of a recorder unit, a second basic circuit also shown in block form in Fig. 1.

The control pulses are generated by the recording unit, which is illustrated in detail in Fig. 3. During the recording operation, the repeater unit is connected to the tape recorder through the recording unit. The control pulses generated by the recording unit operate the projector via the repeater unit, and, as shown in Fig. 1, the pulses are also applied to one track T1 of the tape T, moving in the direction shown as indicated by the arrow, via the auxiliary head A which comprises a record-playback coil R and an erase coil E. Simultaneously during this operation, intelligence representing a suitable sound accompaniment, may be recorded on the tape via sound head H. When the recording unit is set to erase, no control pulse is impressed on the tape and none is delivered to the repeater unit and the absence of such pulse causes the projector to stop. At the same time the erase coil E removes any incidental matter which may have been previously recorded on track T1.

During playback, the recorder unit is disconnected from the system and the repeater unit is connected directly to the auxiliary head of the tape recorder. Accordingly, the control pulses are read off the tape by the record-playback coil R and applied to the repeater unit where they together with the sprocket switch pulses are employed to regulate the speed of the projector. Switches are shown between the repeater, recorder unit and tape recorder to effect the connections discussed above. It is seen that no additional electrical power connections are made to the tape recorder; the tape recorder serving only to pull the tape through the auxiliary head.

Essentially, there are two basic parts to the invention, one being the recorder unit which during the recording operation records the control signals on the magnetic tape while simultaneously applying the signals to the repeater unit, and the second part being the repeater unit which is responsive to the control signals to regulate the speed of the film.

Since the repeater unit is employed during both the recording and repeating periods, it will be described first. It is therefore assumed that accompaniment intelligence has been recorded on one half of the magnetic tape T2, and control signals have been recorded on T1, the opposite half thereof. Thus it is important that the nature of the control signal be understood before describing the repeater unit.

The control signal is essentially a series of pulses at sprocket-hole speed for the film which is used; e. g. with a frame speed of 16 per second for 8 millimeter film, the pulse speed is 16 pulses per second. With 16 millimeter film, which employs two sprocket holes per frame, the pulse speed is 32 pulses per second. For the purposes of description only, it will be assumed that 8 millimeter film is employed and thus a pulse speed of 16 per second.

Magnetic tape, heads and amplifier circuits are poorly suited for efficient operation at frequencies as low as 16 cycles per second. Moreover, the probability of low frequency pick-up from motor and transformer fields at 60 cycles per second is high, with attendant distortion of pulse form. In the vacuum tube circuits which amplify the signal, good response at the low frequency also encourages power hum interference as well as microphonic amplifier problems. Thus, in view of these problems, the control pulses are developed by keying a carrier whose frequency is more nearly optimum for these circuits. This frequency falls in the range of 1000–2000 cycles per second; e. g., a frequency of 1800 cycles per second has been found to be satisfactory. The carrier is keyed 16 times per second for a duration approximately 50% of the total time. The level of these pulses is high enough to saturate the tape so that the signal appears to be nearly square wave bursts of 1800 cycles per second at a rate of 16 bursts per second.

This is the nature of the signal which controls the operation and speed of the projector. The "off" signal is actually the absence of intelligence on the tape, the track having been erased for the period during which the projector is to be "off."

Referring now to Fig. 2, there is illustrated the repeater unit which comprises an amplifier stage generally indicated at 1 and consisting of three amplifier tubes 2, 3 and 4 in cascade. The response of the amplifier tubes 2, 3 and 4 is reduced at low frequencies by means of low capacity coupling capacitors 5, 6 and cathode filtering capacitors 7, 8. The control signal is derived from the record-playback coil R and is applied to the input 10 of the amplifier 2 upon closure of switch RS.

The control signal is amplified by the amplifiers 2, 3 and 4 and applied to a demodulator 11 via transformer 12. The demodulator consists of a diode 11*a*. The demodulated signal, consisting of 16 cycles per second rectangular pulses, appears across resistor 13, and, because of the manner in which the diode is connected, it is positive-going.

The demodulated signal now a positive voltage derived at the cathode of diode 11*a* is directly coupled over resistor 14 to the grid 15 of a pulse-shaper relay control tube 16. The grid of tube 16 is thus driven positive thereby and the tube conducts. Resistor 14 and capacitor 17 together form a filter circuit which removes the residue of the 1800 cycle per second carrier appearing across resistor 13. When no control signal is present, the space current of the control tube 16 is low, being limited by the high resistance of its cathode bias resistor 18 and the lack of a positive voltage being applied to its grid. The signal, however, when present is of high amplitude and positive-going, and causes the tube 16 to carry heavy surges of plate current. The current is heavy because cathode capacitor 19 retards the positive bias applied to the cathode of tube 16. Between pulses, the charge on capacitor 19 leaks off appreciably over resistor 18, thus heavy surges of current occur with each pulse applied to the grid 15. The plate current flows through anode load resistor 20 and through coil of a sensitive relay 21, actuating armature 22 associated with the relay. The surges of current through resistor 20 develop negative pulses, having steep edges. In the absence of a control signal, the plate current of the tube is insufficient to energize relay 21, and its armature 22 is in the rest position illustrated and in contact with its cooperating back contact 24. The presence of control signals causes energization of the relay and movement of the armature 22 to its cooperating front contact 25. A capacitor 23 is coupled across coil 21 to prevent relay chatter due to the pulsating character of the control signal.

When the coil of relay 21 is energized, the armature 22 moves from back contact 24 to front contact 25, completing an energizing path for the coil of a power relay 26 via: ground, armature 22, front contact 25, winding of relay 26 second winding T2*a* of transformer T2, ground. Relay 26 controls armature 27 and causes it to move from back contact 28 to front contact 29. The armature 27 upon moving to front contact 29, completes the projector lamp and projector motor circuits 30 and 31 respectively, via: source, armature 27, front contact 29, lamp 30; and switch 81, motor windings 31 and back to source. Thus, the control signal serves to apply power to the projector through the action of the relays 21 and 26. When a control signal is present, the projector operates and when it is absent, the projector becomes inoperative.

As a convenience, a receptacle 32 is provided so that a lamp when plugged into this receptacle is lit when the projector is idle and is extinguished when the projector is operating.

From the above description thus far, it is seen that the control signal serves to operate the projector; it will now be described how the control signal serves to regulate the speed of the projector, to synchronize the projector motor speed with the magnetic tape. The speed of the projector is regulated by comparing the time-position of the control signal pulse with a second pulse derived from the sprocket and hereinafter called a sprocket pulse. The two pulses are compared in a voltage comparing circuit, and a resultant voltage is developed which is representative of the time-position of the pulses. This resultant voltage is utilized to regulate the speed of the motor.

The voltage comparing circuit, generally indicated at 33, comprises a bi-stable oscillator consisting of two triodes 34, 35, which normally rests with one triode cut-off and the other heavily conducting. It is insignificant to determine which oscillator conducts first, and in practice, random thermal noise usually causes one or the other to conduct initially. Since the bi-stable oscillator is well known to the art, it will not be described in detail. It is known that switch-over from one tube to the other is regenerative until one tube is completely cut-off and the other tube is heavily conducting. It is also known that the condition can be "flipped-over" by applying a negative pulse of voltage to the grid of the conducting tube. The change appears in amplified form at its plate and, in turn, to the grid of the other companion tube in the positive direction. If the initial negative pulse is large enough to cause slight current flow in the other direction, the effect is regenerative and does not terminate until there is a complete reversal of conditions. The voltage comparing circuit 33 is symmetrical; resistor 36 is equal in value to resistor 37 and 38 in series, capacitor 39 is equal to capacitor 40, resistor 41 is equal to resistor 42, and resistor 43 is equal to resistor 44. Resistors 37 and 38 have been selected as such, to provide a suitable potential point for control purposes to be described hereinafter. The voltage at the junction of resistors 37 and 38 is representative of the prevailing state in the voltage comparing circuit. If tube 35 is conducting, the voltage at this point is considerably higher than if tube 34 is conducting.

The bi-stable oscillator is triggered by the sprocket pulse on one side and by the control signal on the opposite side thereof. The contact S of the sprocket switch is coupled over a lead 46 to one electrode of capacitor 47.

Assuming that relay coil 21 is energized and that the armature 22 is contacting contact 25, it is seen that capacitor 47 is charged from the voltage supply line over variable resistor 48, and resistors 49, 50 and 51. The sprocket switch S is connected directly across capacitor 47 and shorts it out when the switch closes. This causes a sharp drop in voltage which is coupled through capacitor 52 and appears across grid resistor 53 as a sharp negative pulse due to the differentiating action of capacitor 52 and resistor 53. When the switch is opened the capacitor 47 charges through resistor 50 at a finite rate, and practically no voltage is coupled to the grid of tube 35 across capacitor 52. As a result, the sprocket switch develops sharp negative pulses at the grid of tube 35, and it makes successive contacts.

If the tube 35 is conducting, the sprocket pulse drives it to the cut-off state, and if it is cut off, the pulse has no effect thereon.

The other half 34 of the bi-stable oscillator is driven by the control signal. The signal pulse developed across resistor 20 is coupled to the grid of tube 34 through a diode 54. The diode 54 acts as a switch, a characteristic which is needed because the signal pulse has a finite slope, which slope is not easily nor economically held to a minimum standard. The leading edge of the control signal across resistor 20 is negative-going and is differentiated by capacitor 55 and resistor 56. Thus, the leading edge develops a negative pulse at the cathode 57 of diode 54, while the trailing edge develops a positive pulse.

Diode 54 is provided with a D.-C. voltage on its cathode 57 which is very nearly equal to the cathode voltage of the bi-stable oscillator. This is accomplished by means of the filter circuit comprising resistor 58 and capacitor 59. Because the grid of tube 34 is never positive with respect to its cathode, the diode 54 can conduct only when its cathode 57 is driven negative. Thus, only the negative component of the control signal is coupled through the diode 54 to the tube 34; the positive pulse is ineffective. When tube 34 is cut off, its grid is appreciably negative with respect to its cathode, and the diode 54 is correspondingly biased heavily in its non-conducting direction, thus effectively switching out the control signal.

When tube 34 is conducting, the diode 54 is on the threshold of conduction, and, when a negative pulse appears at the cathode 57 of the diode 54, it conducts, thereby coupling a sharp negative pulse to the tube 34 and driving the tube 34 towards its opposite condition until "flip-over" of conduction to tube 35 is effected.

The dynamic operation of the voltage comparing circuit is as follows: Regardless of the previous state, the first signal pulse cuts off tube 34, and the voltage at the junction of resistors 37 and 38 rises to a maximum. After a finite time, to be later explained, tube 35 is cut off, by the sprocket pulses causing tube 34 to conduct and thereby drive the voltage at the said junction down to a minimum. As a consequence, the bi-stable oscillator is driven alternately by the signal and sprocket pulses.

When these pulses are perfectly interspaced in time-relation (or balanced in terms of phase), the output voltage waveform is similarly balanced. Unbalance of pulse positions, or phase, causes the positive or negative component to be prolonged with respect to the other, depending upon the direction of shift.

The condition of phase balance is indicated by a bi-luminescent lamp 60, such as a neon lamp, connected across a time-delay device such as a capacitor 45 connected at a symmetrical point in the load circuit between the anodes of tubes 34 and 35. When phase balance exists, the average voltage across resistors 43 and 44 is zero and the neon lamp is extinguished. When unbalance develops, either one side or the other of the neon lamp becomes more positive, and that side glows indicating the direction of unbalance. The intensity of illumination is an indication of the degree of unbalance. These indications serve to advise the operator of mal-adjustment of the equipment.

The voltage appearing at the junction of resistors 37 and 38 controls the speed of the projector over a Speed Regulator Circuit generally indicated at 61. The control voltage as it is delivered from the comparing circuit is coupled to a cathode follower 62, through a filter, comprising resistor 63 and capacitor 64, which removes the sharp transients occurring at "flip-over" of the tube 35. Low impedance output is taken from the cathode 65 of tube 62 and applied directly through resistors 66 and 67 to control tubes 68 and 69 respectively. The resistors 66 and 67 serve as grid current limiters.

The cathodes 70, 71 of the control tubes 68 and 69 respectively, are provided with an adjustable amount of positive voltage over variable resistor 72 so that the effective grid voltage lies principally in the negative region. The precise value of bias is adjusted to provide a condition of balance at any desired frame speed. The output of tubes 68 and 69 is fed through transformer 73 whose primary winding 73P is serially coupled between motor winding 31 of the projector and the mains voltage over an obvious circuit. As will be seen, the bias on the control tubes 68, 69 directly affects the speed of the projector motor 31; "phase balance" prevails when the average voltage output at the junction of resistors 37, 38, is equal to the D. C. grid voltage required to produce the desired frame speed in the projector. The speed control tubes 68, 69, may conveniently be a double-triode, low impedance, low mu tube, capable of controlling heavy plate current with negative grid operation. The output of the speed control tubes 68, 69 is coupled to the motor 31 via a transformer 73 having a split secondary 73S to produce full-wave operation.

When the main power switch 74 is set for automatic operation, as shown, the current of the projector motor 31 flows through the primary 73P of transformer 73. The secondary 73S is so connected, that unless current flows through the motor circuit, no plate voltage is applied to the control tubes 68, 69. When motor current flows, voltage is induced into the secondary and appears at the plates of the control tubes.

The impedance of the primary 73P is selected so that when no current flows through the secondary, the motor current is so low that its speed is well below normal. Taps 75 are provided to permit selection of the correct impedance to suit projector motor characteristics. The impedance ratio of secondary to primary is selected so that when the control tubes carry maximum current, the motor current increases to a value which drives the motor well beyond normal speed. Between these limits a condition is attainable at which correct motor speed obtains.

The plate voltage applied to the control tubes is alternating-current at line frequency. When the control voltage produces current flow in the speed control tubes, each tube carries current on its alternate half cycle.

The dynamic operation of the speed regulator circuit is as follows:

The speed control tubes are driven by alternately high and low grid voltages. The high voltages on the grids of tubes 66, 67 causes the tubes to conduct more current which tends to accelerate the motor and a low grid voltage tends to decelerate the motor. The inertia of the motor armature prevents rapid speed fluctuation between these limits and it rotates at an average speed. A change in speed is accomplished by a change in the relative duration of these opposing voltages.

The capacitor 76 filters out switching transients due to the cut-off-conduction-to-cut-off conditions in the control tubes.

As described above, the film frame speed is preselected by the cathode bias applied to the control tubes 68 and 69. When the magnetic tape is synchronized with the film, overall phase balance obtains because the sprocket pulses occur exactly halfway between the signal pulses, or stated differently, the speed control voltage at the junction of resistors 37, 38 is a balanced 50% square wave with the positive component equal to the negative component.

When errors in speed develop, a compensating reaction occurs. If, for example, the projector motor tends to slow down, the sprocket pulse begins to lag in phase; i. e., past the mid-point. As a result, the oscillator tube 35 conducts for a longer period of time than the tube 34, causing the more positive portion of the speed control voltage to increase in duration, and the other to decrease. Thus, the speed control tubes 68 and 69 cause an increase in current which flows through the motor causing an increase in speed back towards normal.

The problem of attaining synchronism is a special case and more complex than maintaining synchronism. This problem occurs whenever the motor is started from a complete stop. The motor current which is required to maintain motor speed is insufficient to bring the motor up to operating speed quickly. While acceleration is taking place, the action of the bi-stable oscillator is incapable of rapidly bringing about synchronism, if at all. It is therefore necessary to have the motor attain a near-synchronous speed before automatic synchronization is attempted, and it is important to have this occur quickly to reduce starting errors.

The above aims are achieved by means of an automatic initial surge timing circuit comprising resistors 48, 49, 77, capacitor 78 and contact 24 of relay 21.

When the motor is stopped, relay armature 22 is in the position shown and capacitor 78 is discharged to ground over a low impedance resistor 77. The resistor 77 is a surge current limiting resistor and is included principally to protect contact 25 from fusing. The voltage across capacitor 47 is also practically zero.

When the first signal pulse is delivered by the tape through amplifier 1 it energizes relay 21 and delivers a trigger pulse to the bi-stable oscillator tube 34; operation of this tube produces maximum motor current as already explained. The energization of relay 21 closes the energizing circuit of relay 26 which in turn applies power to the projector lamp 30 and the projector motor; however, operation of relay 21 removes the ground to resistor 77, and capacitor 78 charges through resistors 48 and 49.

Because the signal pulse initially produces maximum motor current, the motor accelerates very quickly. Ordinarily, the sprocket pulse drives the control voltage back, reducing the motor current, however, during speed build-up, this action is avoided because the voltage across capacitor 47 builds up slowly due to the finite charging time of capacitor 78 through resistors 48 and 49. The pulse developed by the sprocket is of insufficient amplitude to cut off oscillator tube 35, and thus the maximum motor current is prolonged. And it is not until the voltage across capacitor 47 reaches a predetermined level that the short-circuiting effect of the sprocket can become high enough in amplitude to drive the motor control voltage down to a minimum. The next signal pulse, however, immediately drives the motor control voltage back to maximum, and the automatic synchronizing operation begins.

The time-constant of the power surge circuit is selective, and adjustable for best accuracy, by means of the variable resistor 48, to suit the characteristics of the projector motor. It is adjusted to provide maximum motor current just long enough to permit the motor to reach near-normal speed before automatic speed control is permitted to begin, at which time immediate lock-in of speed is achieved.

The initial power surge over resistor 48 is adjusted by repeatedly starting the projector with a tape control signal, each time trying a new setting for resistor 48. The condition which is sought is the one which produces "lock-in" with minimum hunting, or lagging in speed. The balance indicator neon lamp 60 is used to arrive at the desired condition. Lagging or hunting is indicated by flashing from side to side of the indicator lamp; the minimum of hunt is obtained when the indicator simply extinguishes. Some hunt is permissible since this does not produce error but simply represents rocking in phase before perfect phase balance is attained.

Power switching is accomplished by the switch 74, which is shown in the "On" position. When the switch is thrown to its "Off" position, the projector is connected for its normal, non-automatic operation and can be operated by its built-in switches and speed control (not shown). Through contacts 79 and 80, power is applied to the projector and by means of contact 81 and 82, the control transformer 73 is short-circuited. When automatic operation is desired, the switches which are part of the projector (not shown) are all thrown to full operating positions so that full control can be provided by the repeater unit.

The other basic unit of the invention is the recording unit, illustrated in Fig. 3, which comprises the necessary circuitry for producing and recording the control signal on the magnetic tape.

Referring now to Fig. 3, there is illustrated the recording unit, comprising a playback section, a record-projector section which produces and applies the control signal to the magnetic tape, and the erase section which cleans the tape of signal conditions prior to the application of signals.

The playback section comprises a push-button switch 83, shown in its inactive position, which when depressed, connects record-playback coil R, in the auxiliary head A (Fig. 1) through a resistor 85 to output terminals 86 and 87. The output terminals 86, 87 are coupled to the input 10 of amplifier 1 (Fig. 2). When the recording unit is not in use, the terminal 10 is disconnected from the recording unit and connected directly to the auxiliary pick-up head A (Fig. 1) located in the tape recorder by means of switch RS.

The record-projector section comprises a push-button switch 88, which when depressed connects the recording signal over contacts 89, 90 to the record-playback coil R, and also to the repeater unit over terminals 86, 87. Voltage from the power supply, generally indicated at 93, is applied over contacts 91, 92 to the plates of erase oscillator tube 94 and to recording amplifier 95 over back contacts 100a and 100b of erase switch 100. The recording signal is reduced in level before application to the input 10 of amplifier 1, by means of a voltage divider, comprising resistors 85 and 96; the resistor 85 being grounded over back contacts 97, 98 of switch 83. Initially, when the playback switch 83 is depressed, no recording signal is coupled through the resistor 96, because no plate voltage is applied to the recording amplifier 95, switch 88 being unoperated.

The erase section comprises a push-button switch 100, which when depressed, removes the plate voltage from the recording amplifier 95 by means of opened contacts 100a and 100b, and impresses plate voltage only on the erase oscillator 94 over closed contacts 100c and 100d. Thus, when erasure is effected, a no-signal condition exists on the tape. Since no signal is applied through resistor 96 to the repeater unit, the projector is made to stop.

The erase oscillator tube 94 develops a high frequency erasing signal, e. g., 60 kilocycles per second, which is coupled to erase coil E via oscillator coil 102. Plate resistor 103 is provided to limit the output to a level required by the coil to erase fully. A portion of the erase signal is coupled through capacitor 104 to the recording circuit as A.-C. bias for the recording coil R.

The sprocket frequency oscillator, which generates a frequency of 16 cycles per second for 8 millimeter film, comprises a triode 105 coupled to a conventional phase-shift type tank circuit generally indicated at 106. The oscillator 105 is of the free-running type in order to achieve a high order of frequency stability.

The output of oscillator 105 is coupled to the grid of a keyer tube 107, which controls the operation of the carrier frequency oscillator 108. The carrier frequency oscillator 108 is also of the free-running type and generates a frequency of approximately 1800 cycles per second. The anode of oscillator 108 is connected to the cathode of keyer tube 107 and has a positive potential applied thereto when tube 107 conducts, the voltage developing across cathode resistor 107a. Oscillator 108 is therefore controlled by the operation or non-operation of the keyer tube. The keyer tube is driven to cut-off during the negative half of the waveform produced by the oscillator 105, and therefore the carrier frequency oscillator 108 generates an output of 1800 cycles per second in bursts of the required film frame speed.

The recording amplifier 95, is excited by the output of oscillator 108. The operating characteristics of the tube are selected such that appreciable limiting action occurs in response to the excitation, thereby producing substantially rectangularly-shaped pulses which are applied to the recording coil R over capacitor 110, resistor 111 and closed contacts 90 and 89. Thus, it is seen that during the recording operation, the control signals are applied directly to the repeater unit for synchronizing the projector, and also to the magnetic tape. When it is desired to run the projector automatically in synchronism with the playback of the recorded intelligence, the recorder unit shown in in Fig. 3 is disconnected and the terminals 86, 87 are removed from the position shown in Fig. 3, and connected directly to the terminals of the record-projector-coil R as shown in Fig. 2.

While I have described above the principles of my invention in connection with specifiic apparatus, it is to be clearly understood that this description is made only by way of example and not as a limitation to the scope of my invention as set forth in the objects thereof and in the accompanying claims.

What is claimed is:

1. In combination, a silent-film motion picture projector; a magnetic tape recorder utilizing a dual-track tape, means for recording intelligence signals on one track of said tape during the operation of said projector in given time relationship with the pictures on said film, means for recording a control signal on the other track of said tape in given physical relationship with said recorded intelligence signals; and means for playing back said intelligence in the same given time relationship with said pictures, comprising a signal comparison circuit characterized by a bi-stable multivibrator circuit, means for applying said control signals to one side of said multivibrator circuit, means for generating signals corresponding to the actual film speed and applying such signals to the other side of said multivibrator circuit, either of said signals being capable of cutting-off the side to which it is applied if such side is conducting, means connecting a load circuit between the outputs of said respective sides of said multivibrator circuit, whereby when the successive outputs of said sides are of equal duration there is no voltage difference across said load circuit indicating no deviation from said given time relationship, and when there is a voltage difference across said load circuit the magnitude thereof is proportional to the deviation from said given time relationship; a projector motor variable-speed control circuit, and means for coupling said load circuit to said speed control circuit, whereby any deviation which occurs is corrected by varying the speed of the projector motor until the given time relationship is attained.

2. The combination, according to claim 1, wherein said multivibrator circuit comprises a pair of electron discharge tubes each having cathode, control and anode electrodes, whereby one tube is normally conducting and during the conduction thereof the other tube is cut-off, means applying said control signals to the control electrode of one tube and means applying the other signals to the control electrode of the other tube, means connecting said load circuit between the anodes of said tubes, means connecting a voltage-responsive indicator at a symmetrical point in said load circuit, a time-delay device, said indicator having a pair of terminals connected across said time-delay device, whereby when the successive outputs from said responsive tubes are of equal duration the voltage on one of said terminals is equal to the voltage on the opposite terminal producing a balance of voltage conditions with respect to said indicator, and when the outputs from said tubes are not of equal duration an unbalance of voltages occurs operating said indicator.

3. The circuit according to claim 2, wherein said load circuit comprises a pair of resistors of equal resistance and said time-delay device comprises a capacitor coupled between said resistors, the terminals of said indicator being coupled across said capacitor.

4. The circuit according to claim 2, wherein said indicator comprises visual indicator means.

5. The circuit according to claim 4, wherein said visual indicator comprises a gas-discharge lamp having a pair of electrodes connected to said terminals respectively, the electrode having the higher applied voltage being rendered glowing.

6. The circuit according to claim 5, wherein said lamp comprises a neon glow-discharge tube.

7. The combination, according to claim 1, wherein said motor speed control circuit comprises a pair of electron tubes, each having cathode control and anode electrodes, means coupling the control electrodes to the output of said comparison circuit, a transformer, means for coupling its primary across said projector motor and its secondary to said anodes, means for applying a source of alternating current to said projector motor, a source of biasing voltage, means for applying said biasing voltage to the cathodes of said tubes, the value of said biasing voltage being positive with respect to the output from said comparison circuit, means for center tapping the secondary of said transformer to ground whereby full wave operation of speed control is effected; the output from said comparison circuit being a voltage of predetermined magnitude while said projector motor is operating at the desired speed and a voltage of greater or lesser magnitude depending on the sense of deviation, so that the effect of the voltage adjusts the speed of the motor to the desired speed.

8. In combination, a silent film motion picture projector, a magnetic tape recorder utilizing a dual-track tape, means for recording intelligence on one track of said tape during operation of said projector, in given time-relationship with the pictures on said film, a generator for producing a control signal having a frequency related to a desired film speed, means for recording said control signal on the other track of said tape in given physical relationship with said recorded intelligence; and means for playing back said intelligence in the same given time relationship with said pictures comprising a bi-stable multivibrator circuit, means for reading off said control signals from said tape and applying them to one side of said multivibrator circuit, means for generating signals related to the actual film speed and applying them to the other side of said multivibrator circuit, the control signals and the actual film speed signals being spaced in time and of such polarity and magnitude as to render nonconducting the respective side of said multivibrator to which they are applied, a voltage divider circuit coupled to the output of said multivibrator and proportioned to provide an output voltage varying in amplitude depending on the side of the multivibrator which is conducting, the time-spacing of the respective signals determining the average magnitude of output voltage during each cycle of operation, said projector including a variable speed motor, a speed control circuit coupled between said motor and said voltage divider circuit, for varying the speed of the motor in response to and in correspondence with the average output voltage, whereby when the motor is operating at the desired speed the respective signals are evenly spaced in time and the average magnitude of said output voltage has no effect upon the speed of the projector motor.

9. The combination according to claim 8, wherein said means for generating signals corresponding to the actual film speed, comprises a contact switch coupled to a film-feeding sprocket on said projector, means coupling said sprocket to ground potential, and means including said switch for producing a signal each time contact is made between said switch and said sprocket, whereby the frequency of said signals is proportional to the actual speed of said film.

10. The combination according to claim 9, wherein said control signal generator comprises means for producing a signal having a frequency equal to the desired speed in terms of sprocket-holes-per-second.

11. The combination according to claim 8, wherein said motor speed control circuit comprises a pair of electron tubes, each having cathode, control and anode electrodes, means coupling the control electrodes to the output of said voltage divider circuit, a transformer, means for coupling its primary across said projector motor and its secondary to said anodes, means for applying a source of alternating current to said projector motor, a source of biasing voltage, means for applying said biasing voltage to the cathodes of said tubes, the value of said biasing voltage being positive with respect to the output from said comparison circuit and means for center-tapping the secondary of said transformer to ground whereby full wave operation of speed control is effected; the output from said voltage divider circuit being a voltage of predetermined magnitude while said projector motor is operating at the desired speed and a voltage of greater or lesser magnitude depending on the sense of deviation, so that the effect of the voltage adjusts the speed of the motor to the desired speed.

References Cited in the file of this patent

UNITED STATES PATENTS

| | | |
|---|---|---|
| 1,210,323 | Janssens | Dec. 26, 1916 |
| 2,321,581 | Conover | June 15, 1943 |
| 2,378,611 | Westerkamp | June 19, 1945 |
| 2,475,439 | Waller et al. | July 5, 1949 |
| 2,612,547 | Johnstone et al. | Sept. 30, 1952 |
| 2,679,187 | Bitting | May 25, 1954 |
| 2,688,126 | Weller | Aug. 31, 1954 |
| 2,697,754 | Ranger | Dec. 21, 1954 |